United States Patent [19]
Oughton

[11] Patent Number: 5,705,882
[45] Date of Patent: *Jan. 6, 1998

[54] OPTICAL COATING AND LAMP EMPLOYING SAME

[75] Inventor: Andre R. Oughton, Boxford, Mass.

[73] Assignee: Osram Sylvania Inc., Danvers, Mass.

[*] Notice: The term of this patent shall not extend beyond the expiration date of Pat. No. 5,550,423.

[21] Appl. No.: 658,036

[22] Filed: Jun. 4, 1996

Related U.S. Application Data

[63] Continuation of Ser. No. 546,520, Oct. 20, 1995, Pat. No. 5,550,423.

[51] Int. Cl.$^6$ .................................. H01K 1/32; G02B 5/28
[52] U.S. Cl. ........................ 313/112; 313/635; 359/359; 359/589
[58] Field of Search ............................... 313/112, 113, 313/473, 474, 635; 359/359, 577, 580, 584, 588, 589, 590

[56] References Cited

U.S. PATENT DOCUMENTS

| | | | |
|---|---|---|---|
| 4,229,066 | 10/1980 | Rancourt et al. | 350/1.6 |
| 4,663,557 | 5/1987 | Martin, Jr. et al. | 313/112 |
| 4,854,670 | 8/1989 | Mellor | 350/166 |
| 5,138,219 | 8/1992 | Krisl et al. | 313/112 |
| 5,179,318 | 1/1993 | Maeda et al. | 313/466 |
| 5,179,468 | 1/1993 | Gasloli | 359/359 |
| 5,209,689 | 5/1993 | Griffin et al. | 445/27 |
| 5,250,873 | 10/1993 | McHugh | 131/274 |
| 5,550,423 | 8/1996 | Oughton | 313/112 |

*Primary Examiner*—Nimeshkumar Patel
*Attorney, Agent, or Firm*—Carlo S. Bessone

[57] ABSTRACT

An optical interference coating for reflecting infrared radiation and transmitting visible radiation. The coating includes three spectrally adjacent, multiperiod dielectric stacks. Two of the dielectric stacks are shortwave pass stacks. The third dielectric stack contains seven alternating layers of high and low refractive index materials.

10 Claims, 3 Drawing Sheets

OPTICAL COATING AND LAMP EMPLOYING SAME

This application is a continuation of application Ser. No. 08/546,520 filed on Oct. 20, 1995, now U.S. Pat. No. 5,550,423.

FIELD OF THE INVENTION

This invention relates in general to thin film optical coatings and pertains, more particularly, to optical coatings deposited on a surface of an electric lamp envelope.

BACKGROUND OF THE INVENTION

Thin film optical coatings of the interference filter variety consist of alternating layers of a low refractive index material such as silica and a high refractive index material such as tantala, titania, niobia and the like for selectively reflecting and transmitting different portions of the electromagnetic spectrum emitted by the filament. In one application, these coatings form an optical interference filter for selectively reflecting infrared energy emitted by the lamp filament back to the filament while transmitting the visible light portion of the electromagnetic spectrum emitted by the filament. As a result, the amount of electrical energy required to maintain the operating temperature of the filament is reduced.

Such filters and lamps employing same are disclosed, for example, in U.S. Pat. No. 4,229,066, which issued to Rancourt et al on Oct. 21, 1980. Rancourt et al disclose a visible transmitting and infrared reflecting filter comprising at least one period of a stack formed of a plurality of layers of high and low index materials with alternate layers being formed of materials having a high index of refraction and the other layers being formed of materials having a low index of refraction. One or more anti-reflection layers are disposed between adjacent layers of the period. The forty-seven layer filter presented as an example in column 5 of Rancourt et al includes thirty-seven thin layers (i.e., less than 400 Angstrom).

U.S. Pat. No. 5,138,219, which issued to Krisl et al on Aug. 11, 1992, discloses a filter comprising three spectrally adjacent multiperiod stacks with the first stack being a conventional shortwave pass stack having at least two periods. The second and third stacks are spectrally located at wavelengths different from each other and longer than the wavelength of the first stack. The latter two stacks each comprise at least two periods, with each period containing seven alternating layers of high and low refractive index materials. In the example presented in TABLE 2, Krisl et al disclose a filter containing 24 thin layers to provide a spectrally broad high transmittance between 400 and 770 nanometers.

Although the above-described filters of Rancourt et al and Krisl et al may be effective for reflecting infrared radiation while transmitting visible radiation, certain disadvantages still exist. For example, it is well known that thin layers of such filters are more difficult to deposit than thick layers.

U.S. Pat. No. 4,663,557, which issued to Martin, Jr. et al on May 5, 1987, discloses a filter comprising three spectrally adjacent multiperiod stacks with the first and third stacks being conventional shortwave pass stacks and the second stack being a 2:1 dielectric stack. While all of the layers of the filter are relatively thick (i.e., greater than 400 nanometers) and therefore much easier to deposit, the produced filter is more sensitive to errors in deposition because the window of visible transmission is very narrow.

Often optical coatings of the prior art are designed for maximum reflection over the infrared and maximum transmission over the visible. However, this design criteria ignores the fact that a lamp is a Plankian radiator and thus does not have a flat radiated energy distribution.

SUMMARY OF THE INVENTION

It is, therefore, an object of the present invention to obviate the disadvantages of the prior art.

It is still another object of the invention to provide an improved optical coating which requires a fewer number of thin layers.

It is another object of the invention to provide an optical coating which is not composed solely of thick layers.

It is still another object of the invention to provide an optical coating which produces maximum infrared reflection in a portion of the electromagnetic spectrum where infrared emission from the filament is the highest.

These objects are accomplished in one aspect of the invention by the provision of an optical interference coating for reflecting infrared radiation and transmitting visible radiation comprising three spectrally adjacent multiperiod stacks. Two of the stacks are shortwave pass stacks and the third stack contains seven alternating layers of high and low refractive index materials. The third stack has a period of the form [L/a H/b L/c H/d L/c H/b L/a] wherein a, b, c and d are predetermined values, and wherein L and H are a low and a high index of refraction material, respectively. L and H each are defined as having an optical thickness of a multiple of a quarterwave of the stack wavelength.

In accordance with further teachings of the present invention, each of the shortwave stacks is a quarterwave stack containing periods of the form [L/2 H L/2]. Preferably, the third stack is spectrally located at a wavelength longer than the wavelengths the shortwave pass stacks. In a preferred embodiment, each of the stacks have at least three periods.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention will become more readily apparent from the following exemplary description in connection with the accompanying drawings, wherein.

BEST MODE FOR CARRYING OUT THE INVENTION

For a better understanding of the present invention, together with other and further objects, advantages and capabilities thereof, reference is made to the following disclosure and appended claims in connection with the above-described drawings.

Figure 1:
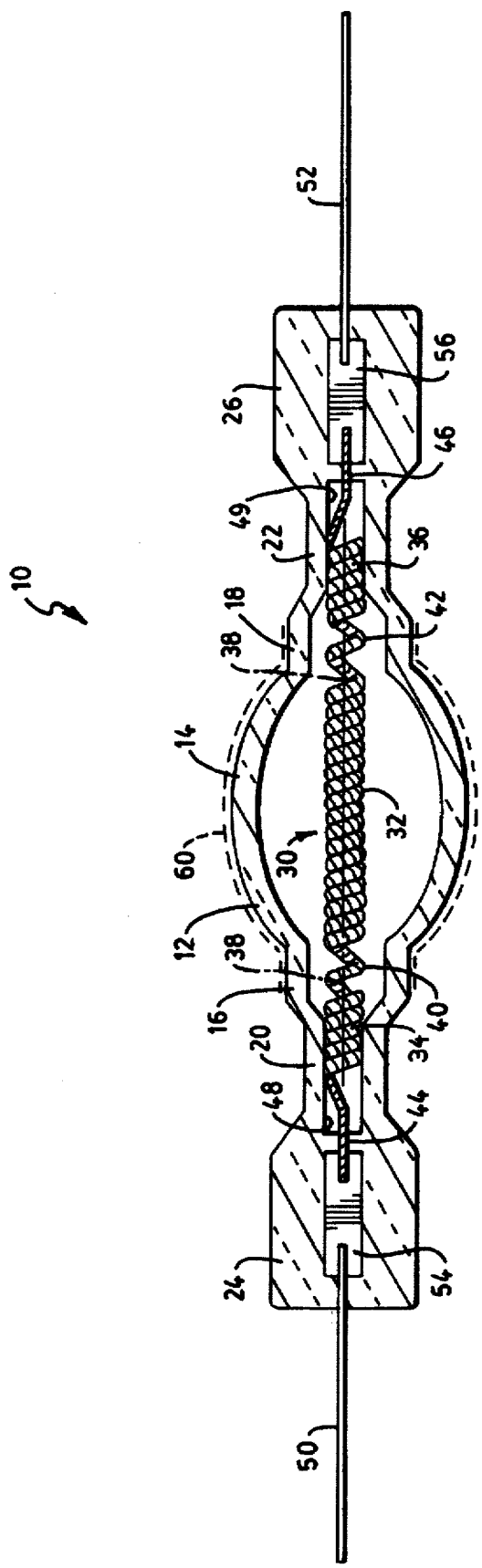
FIG. 1 represents a front elevational view, partially in cross-section, of one embodiment of an incandescent lamp having an optical coating of the present invention disposed on an outer surface of the lamp envelope.

Referring to the drawings with greater particularity, FIG. 1 shows a preferred embodiment of the present invention. In particular, FIG. 1 illustrates a double-ended, tubular incandescent lamp 10 comprising a hermetically sealed envelope 12 of a vitreous, light-transmitting material such as fused silica. The lamp envelope 12 may include the following sections: a central section 14, preferably two transition sections 16 and 18, connected to opposite ends of the central section 14, two filament support sections 20 and 22, connected to transition sections 16 and 18, respectively, and two press seal sections 24 and 26, located at opposite ends of the lamp envelope.

A filament 30 is mechanically supported within double-ended tubular lamp envelope 12 and, preferably, has a "coiled coil" configuration with three coaxial segments: a center segment 32 and two end segments 34 and 36. The filament 30 has a central axis 38 along which the three segments are coaxially located. The center segment 32 is attached to end segments 34 and 36 through skip turns 40 and 42, respectively. Inlead portions 44 and 46 are located at opposite ends of the filament 30 and are connected to the end segments 34 and 36, respectively. The end segments of the filament are electrically inactive during operation. The skip turns provide accurate axial filament segment positioning within a double-ended envelope by providing axial spacing between the end segments 34 and 36 and the center segment 32. In doing so, the skip turns 40 and 42 provide separation between the electrically active and inactive filament segments during operation.

The transition sections 16 and 18, which surround the filament skip turns 40 and 42, have a constant diameter and have an inside diameter slightly larger than the outside diameter of the skip turns such that a positive clearance exists between the filament 30 and envelope 12 in the transition sections 16 and 18. This clearance is provided to prevent any deleterious interaction between the active portion of the filament 30 (center segment 32) and the lamp envelope 12 during lamp operation. Within the transition sections 16 and 18, the filament 30 transitions from active to inactive through the skip turns 40 and 42 due to the presence of the retained mandrels (not shown) in the end segments 34 and 36.

The filament support sections 20 and 22 mechanically retain the filament end segments 34 and 36, respectively, serving to accurately position the filament 30 centrally within the central section 14. The inside surfaces 48 and 49 of the filament support sections 20 and 22 contact the filament end segments 34 and 36, respectively. Because the end segments 34 and 36 are electrically inactive, no harmful interaction between the filament 30 and quartz lamp envelope occurs.

The filament inlead portions 44 and 46 are connected to external leads 50 and 52 by molybdenum foil conductors 54 and 56, respectively. The foil conductors 54 and 56 pass through the press seal sections 24 and 26, respectively, at opposite ends of the lamp envelope 12. The press seal sections 24 and 26 provide a hermetic seal between the quartz lamp envelope 12 and the foil conductors 54 and 56. Electrical power is supplied to the filament 30 through the external leads 50 and 52.

A "tacking" process, which shrinks the filament support sections 20 and 22 around the end segments 34 and 36, respectively, may be used to create an intimate locking fit, thereby securing the filament 30 in a fixed position relative to the lamp envelope 12 during the lamp making process. A suitable tacking process is described in U.S. Pat. No. 5,209,689 issued on May 11, 1993 and hereby incorporated by reference.

During manufacture, envelope 12 is exhausted and an inert fill gas and one or more halogens (i.e., iodine, bromine, chlorine and fluorine) is introduced. In a preferred embodiment of a low voltage lamp (e.g., 12 volts), the lamp fill comprises (by volume) 0.3% hydrogen bromide, a phosphine getter, with the balance being krypton. The total fill pressure is about 5 atmospheres absolute at room temperature. In a preferred embodiment of a 120 volt lamp, the lamp fill comprises (by volume) 0.17% hydrogen bromide, a phosphine getter, with the balance being a 95% krypton/5% nitrogen blend. The total fill pressure is about 5 atmospheres absolute at room temperature. It is to be recognized that the envelope and filament structure of the incandescent lamp of the present invention may have configurations other than that which is shown in FIG. 1.

During lamp operation, the halogen gas reacts with tungsten which has evaporated from the filament. The resulting gas is chemically decomposed at the hot surface of the tungsten filament so that the tungsten atoms therein are deposited on the filament and the halogen is freed to scavenge additional liberated tungsten atoms. In order for the halogen cycle lamp to operate properly, the envelope 12 must be maintained at a high temperature in the vicinity of about 800° C. and generally this is accomplished by keeping the diameter of the envelope relatively small.

Figure 2:
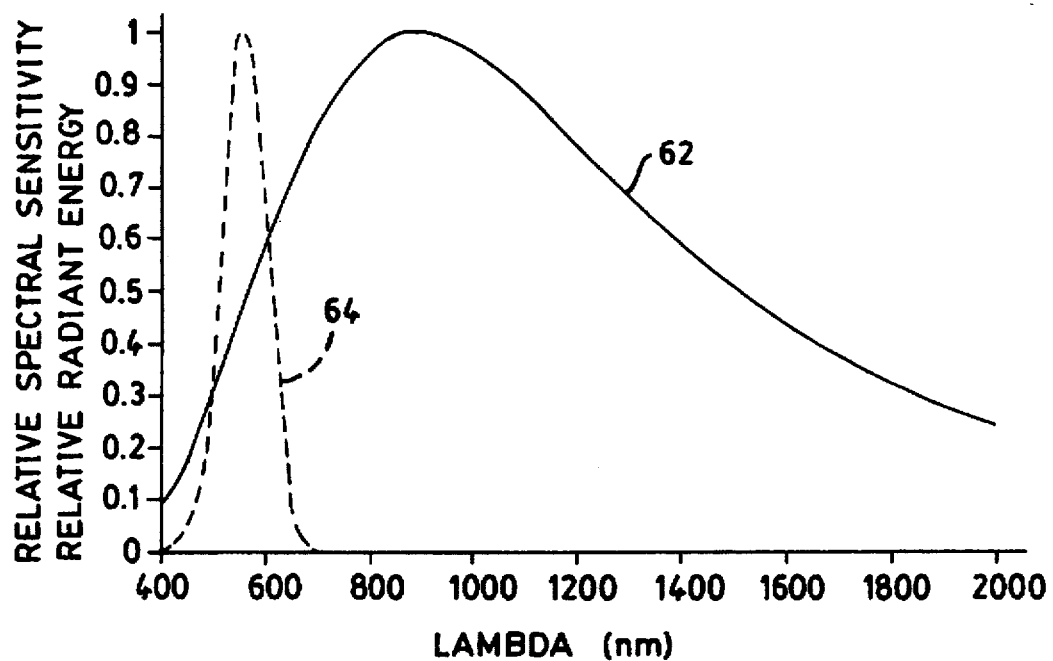
FIG. 2 is a graph illustrating the radiant energy spectrum from a 3,000 Kelvin black body and the spectral sensitivity of the human eye.

FIG. 2 is a graph illustrating the radiant energy spectrum from a 3,000 Kelvin black body (curve 62) and showing that only a small percentage of the total radiation from the filament of a halogen cycle lamp is in the visible light region between 400 and 700 nanometers. Curve 64 in FIG. 2 illustrates the spectral sensitivity of the human eye. It is clear from FIG. 2 that the majority of the radiation emitted by the filament is in the infrared region above the visible light region of the spectrum (i.e., greater than 700 nanometers). Unless the lamp is to be used for both heating and lighting, the emission of the infrared radiation from the lamp is wasteful of energy and in some applications produce an undesirable heating of the surrounding environment.

Accordingly, the outer surface of central section 14 of envelope 12 includes an optical coating 60. Optical coating 60 comprises an optical interference filter which selectively reflects infrared energy emitted by filament 30 back to the filament wherein at least a portion of the infrared radiation is absorbed by the filament. This reflected energy helps to heat the filament which reduces the amount of energy required to maintain the filament at its designed operating temperature. The central section 14 of envelope 12 is geometrically shaped and preferably ellipsoidal in shape to optically optimize reflected infrared light rays onto the electrically active center segment 32 of the filament 30.

Figure 3:
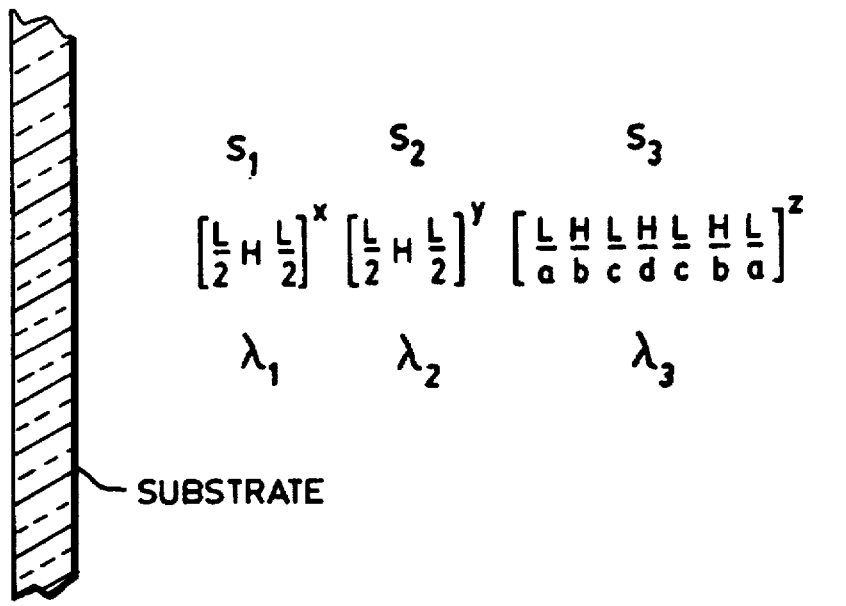
FIG. 3 is a representation of an optical filter according to the present invention showing the design of each stack.

FIG. 3 illustrates a representation of an optical filter according to the present invention consisting of three spectrally adjacent multiperiod stacks $S_1$, $S_2$ and $S_3$ each having a respective stack wavelength $\Lambda_1$, $\Lambda_2$ and $\Lambda_3$. By spectrally adjacent is meant that the longest high reflectance wavelength of one stack coincides approximately with the shortest high reflectance wavelength of the other stack. A stack wavelength is defined as the wavelength at which the strongest reflection or stop band is located.

The optical filter comprises alternating layers of a low refractive index material (represented by L) such as silica and a high refractive index material (represented by H) such as tantala, titania, niobia and the like for selectively reflecting and transmitting different portions of the electromagnetic spectrum emitted by the filament. Materials L and H each have an optical thickness defined as one-quarter of the stack wavelength, or a quarterwave optical thickness. Layers forming a period are surrounded by brackets, with the superscripts x, y and z being the number of times the period is repeated in the stack. The values for the denominators a, b, c and d in the third stack are chosen based upon the required optical thickness $T_o$ of each layer according to the formula:

$$T_o = \Lambda/(4 \times \text{denominator})$$

wherein $\Lambda$ is the design wavelength of the stack. The physical thickness $T_p$ of each layer is equal to the optical thickness $T_o$ divided by the index of refraction of the material.

The first dielectric stack $S_1$ is the shortest wavelength stack and is a conventional shortwave pass stack filter having a dielectric stack design generally expressed as $[L/2\ H\ L/2]^x$. Stack $S_1$ is considered a shortwave pass filter since it has very low reflectance at wavelengths less than the design wavelength and then a region of substantial reflectance at wavelengths greater than the design wavelength.

In the preferred embodiment, the first stack $S_1$ is shown as being in contact with the substrate. However, the order of two or all of the stacks may be switched. For example, instead of being in contact with the substrate, the first stack may be in contact with the ambient. If silica is chosen as the first layer L/2 of the first stack $S_1$ and fused silica is being used as the substrate, the first layer can be considered as being part of the substrate.

Typically, the values for denominators a, b, c and d are as follows:

$2 \leq a \leq 4$ $5 \leq b \leq 15$ $5 \leq c \leq 15$ $1 \leq d \leq 2.5$

The number of periods x in the first stack S1 is generally greater than or equal to 3.

The second or middle stack $S_2$ is a second conventional shortwave pass stack filter having a dielectric stack design generally expressed as $[L/2\ H\ L/2]^y$. The design wavelength of the second shortwave stack is typically greater than the design wavelength of the first shortwave pass stack $S_1$. The number of periods y in the second stack $S_2$ is generally greater than or equal to 3.

As illustrated in FIG. 3, each period z of the third stack $S_3$ of the optical filter contains seven alternating layers of high and low reflective index materials. The third stack $S_3$ is shown as being in contact with the ambient.

Figure 4:
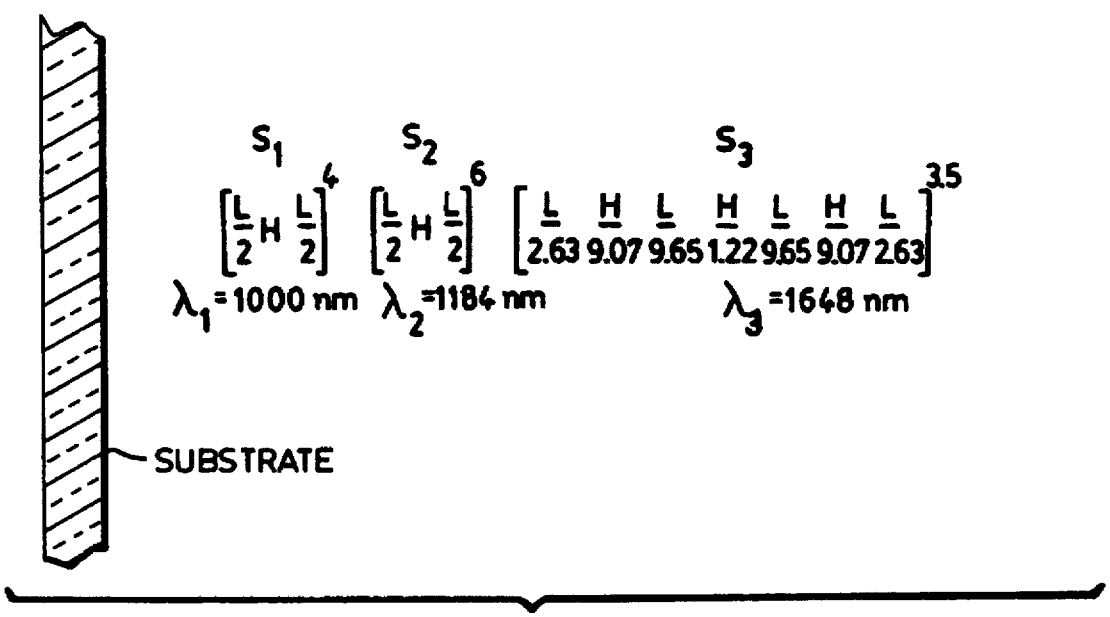
FIG. 4 is a representation of an actual filter according to the present invention.

FIG. 4 represents an unoptimized example of an optical interference filter in accordance with one embodiment of the present invention. In this example, the first shortwave pass filter (i.e., stack $S_1$) comprises 4 periods and has a design wavelength of 1000 nanometers. The second shortwave pass filter (i.e., stack $S_2$) comprises 6 periods and has a design wavelength of 1184 nanometers. The third dielectric stack $S_3$ comprises 3.5 periods and has a design wavelength of 1648 nanometers. The actual values for the denominators a, b, c and d of FIG. 3 are shown in FIG. 4.

The necessary calculations are applied to the complete filter design illustrated in FIG. 4 for alternating layers of high and low refractive index layer materials consisting of tantala ($Ta_2O_5$) and silica ($SiO_2$) having an index of refraction of 2.18 and 1.46, respectively. TABLE I shows the number of layers and physical thickness of each layer following conventional computer optimization techniques.

TABLE I

| Layer | Optimized Thickness (nanometer) | Material | Stack | Period |
|---|---|---|---|---|
| 0 | — | Substrate | $S_1$ | A |
| 1 | 121.15 | Tantala | $S_1$ | A |
| 2 | 172.20 | Silica | $S_1$ | A/B |
| 3 | 106.70 | Tantala | $S_1$ | B |
| 4 | 162.69 | Silica | $S_1$ | B/C |
| 5 | 108.34 | Tantala | $S_1$ | C |
| 6 | 170.29 | Silica | $S_1$ | C/D |
| 7 | 137.87 | Tantala | $S_1$ | D |
| 8 | 27.99 | Silica | $S_1/S_2$ | D/A |
| 9 | 144.84 | Tantala | $S_2$ | A |
| 10 | 199.32 | Silica | $S_2$ | A/B |
| 11 | 134.32 | Tantala | $S_2$ | B |
| 12 | 204.37 | Silica | $S_2$ | B/C |
| 13 | 134.89 | Tantala | $S_2$ | C |
| 14 | 204.91 | Silica | $S_2$ | C/D |
| 15 | 135.01 | Tantala | $S_2$ | D |
| 16 | 203.98 | Silica | $S_2$ | D/E |
| 17 | 135.26 | Tantala | $S_2$ | E |
| 18 | 202.84 | Silica | $S_2$ | E/F |
| 19 | 132.94 | Tantala | $S_2$ | F |
| 20 | 212.31 | Silica | $S_2/S_3$ | F/A |
| 21 | 34.29 | Tantala | $S_3$ | A |
| 22 | 21.58 | Silica | $S_3$ | A |
| 23 | 179.47 | Tantala | $S_3$ | A |
| 24 | 27.02 | Silica | $S_3$ | A |
| 25 | 19.38 | Tantala | $S_3$ | A |
| 26 | 199.75 | Silica | $S_3$ | A/B |
| 27 | 21.83 | Tantala | $S_3$ | B |
| 28 | 30.85 | Silica | $S_3$ | B |
| 29 | 146.63 | Tantala | $S_3$ | B |
| 30 | 27.59 | Silica | $S_3$ | B |
| 31 | 18.99 | Tantala | $S_3$ | B |
| 32 | 217.31 | Silica | $S_3$ | B/C |
| 33 | 21.88 | Tantala | $S_3$ | C |
| 34 | 33.45 | Silica | $S_3$ | C |
| 35 | 144.17 | Tantala | $S_3$ | C |
| 36 | 29.60 | Silica | $S_3$ | C |
| 37 | 17.64 | Tantala | $S_3$ | C |
| 38 | 231.29 | Silica | $S_3$ | C/D |
| 39 | 18.45 | Tantala | $S_3$ | D |
| 40 | 41.89 | Silica | $S_3$ | D |
| 41 | 138.29 | Tantala | $S_3$ | D |
| 42 | 95.22 | Silica | Anti-reflection layer | |
| | | Air | | |

Referring specifically to the example in TABLE I, it can be seen that the optical interference filter contains three spectrally adjacent, multiperiod dielectric stacks $S_1$, $S_2$ and $S_3$ wherein each stack has at least three periods.

The layers labeled 1–8 in TABLE I in combination with the substrate form a first dielectric stack $S_2$ which comprises a shortwave pass optical interference filter at a design wavelength of 1000 nanometers. As shown in TABLE I, the shortwave pass filter comprises four periods A, B, C and D. The first period includes a portion of the fused silica substrate together with layers 1 and 2. Layer 2–4, 4–6 and 6–8 comprises periods B, C, and D, respectively. Dielectric stack $S_1$ has very low reflectance at wavelengths less than the design wavelength of 1000 nanometers and then a region of substantial reflectance at wavelengths greater than 1000 nanometers.

Layers 8–20 in TABLE I form a second dielectric stack $S_2$ in the form of a shortwave pass interference filter having a design wavelength of 1184 nanometers. This second shortwave pass filter comprises six periods A, B, C, D, E and F.

The third stack $S_3$ of the optical interference filter comprises layers 20–41. As shown in TABLE I, stack $S_3$ comprises 3.5 periods A, B, C and D. Complete periods A, B and C contain seven alternating layers of high and low reflective index materials. Layers 20–26, 26–32 and 32–38 comprise periods A, B, and C, respectively. Partial period D comprises layers 38–41. In order to reduce reflection, the optical interference filter may include an anti-reflection layer 42 which, in the present example, has a physical thickness of 95.2 nanometers.

Figure 5:
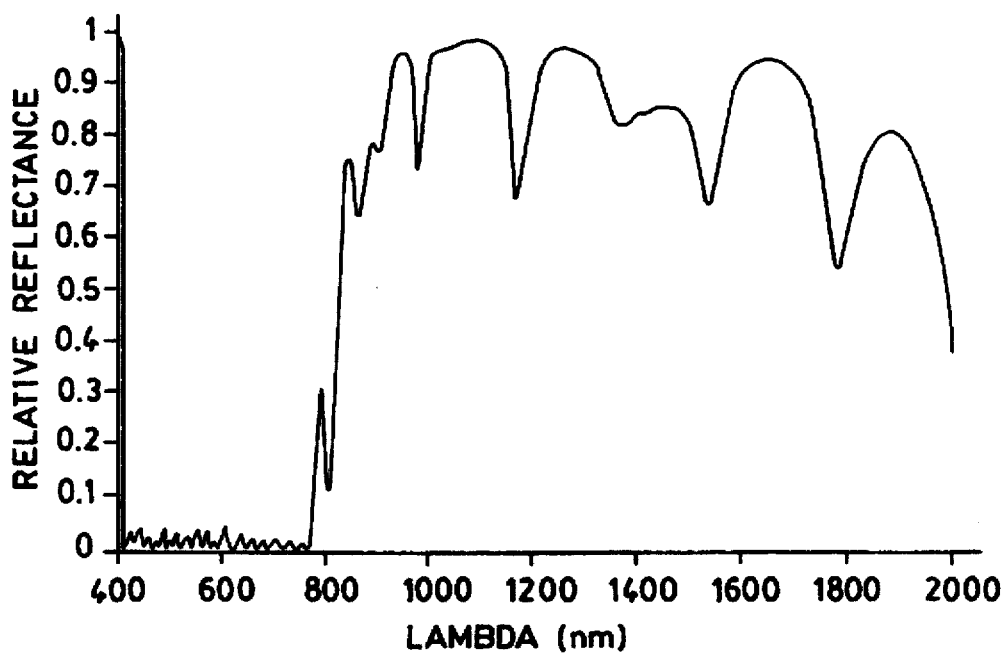
FIG. 5 is a graph of the spectral reflectance of an optical filter according to the present invention.

FIG. 5 is a graph of the spectral reflectance of the optimized optical filter depicted in TABLE I. Computer optimization is used to balance the need for high infrared reflection and minimum layer count. Although the optical filter of the present invention may not have a higher average infrared reflection than prior art filters, the present filter has a higher average reflected energy.

There has thus been shown and described an improved optical coating containing a reduced number of thin layers to achieve the required transmission window without loss of infrared reflection capabilities. The optical coating does not consist solely of thick layers and produces maximum infrared reflection in a portion of the electromagnetic spectrum where infrared emission from the filament is the highest.

While there have been shown and described what are at present considered to be the preferred embodiments of the invention, it will be apparent to those skilled in the art that various changes and modifications can be made herein without departing from the scope of the invention. The actual scope of the invention is intended to be defined in the following claims when viewed in their proper perspective based on the prior art.

What is claimed is:

1. An optical interference coating for reflecting infrared radiation and transmitting visible radiation comprising:

three spectrally adjacent multiperiod stacks each having a respective stack wavelength, a first and a second of said stacks being shortwave pass stacks, said first and second shortwave pass stacks each having very low reflectance at wavelengths less than said respective stack wavelength and then a region of substantial reflectance at wavelengths greater than said respective stack wavelength;

the third of said spectrally adjacent multiperiod stacks containing seven alternating layers of high and low refractive index materials and having a period of the form (L/a H/b L/c H/d L/c H/b L/a)

wherein a, b, c and d are predetermined values, and wherein L and H are a low and high index of refraction material, respectively, L and H each being defined as having an optical thickness of a multiple of a quarterwave of the third stack wavelength.

2. The optical interference coating of claim 1 wherein said low refractive index material is silica and said high refractive index material is tantala.

3. The optical interference coating of claim 1 wherein said third stack is spectrally located at a wavelength longer than the wavelengths said first and second shortwave pass stacks.

4. The optical interference coating of claim 1 wherein each of said stacks has at least three periods.

5. The optical interference coating of claim 1 wherein the values of a, b, c and d are defined as $2 \leq a \leq 4$; $5 \leq b \leq 15$; $5 \leq c \leq 15$ and $1 \leq d \leq 2.5$.

6. An electric lamp comprising:

an envelope of light-transmitting material containing a filament, at least a portion of a surface of said envelope having an optical interference coating disposed thereon for reflecting infrared radiation and transmitting visible radiation;

said optical interference coating comprising three spectrally adjacent multiperiod stacks each having a respective stack wavelength, a first and a second of said stacks being shortwave pass stacks, said first and second shortwave pass stacks each having very low reflectance at wavelengths less than said respective stack wavelength and then a region of substantial reflectance at wavelengths greater than said respective stack wavelength;

the third of said spectrally adjacent multiperiod stacks containing seven alternating layers of high and low refractive index materials and having a period of the form (L/a H/b L/c H/d L/c H/b L/a)

wherein a, b, c and d are predetermined values, and wherein L and H are a low and a high index of refraction material, respectively, L and H each being defined as having an optical thickness of a multiple of a quarterwave of the third stack wavelength.

7. The electric lamp of claim 1 wherein said low refractive index material is silica and said high refractive index material is tantala.

8. The electric lamp of claim 1 wherein said third stack is spectrally located at a wavelength longer than the wavelengths said shortwave pass stacks.

9. The electric lamp of claim 1 wherein each of said stacks has at least three periods.

10. The electric lamp of claim 1 wherein the values of a, b, c and d are defined as $2 \leq a \leq 4$; $5 \leq b \leq 15$; $5 \leq c \leq 15$ and $1 \leq d \leq 2.5$.

* * * * *